Sept. 11, 1934.     A. G. DENIS     1,973,470
PHOTOGRAPHIC PRINTING APPARATUS
Filed May 11, 1931
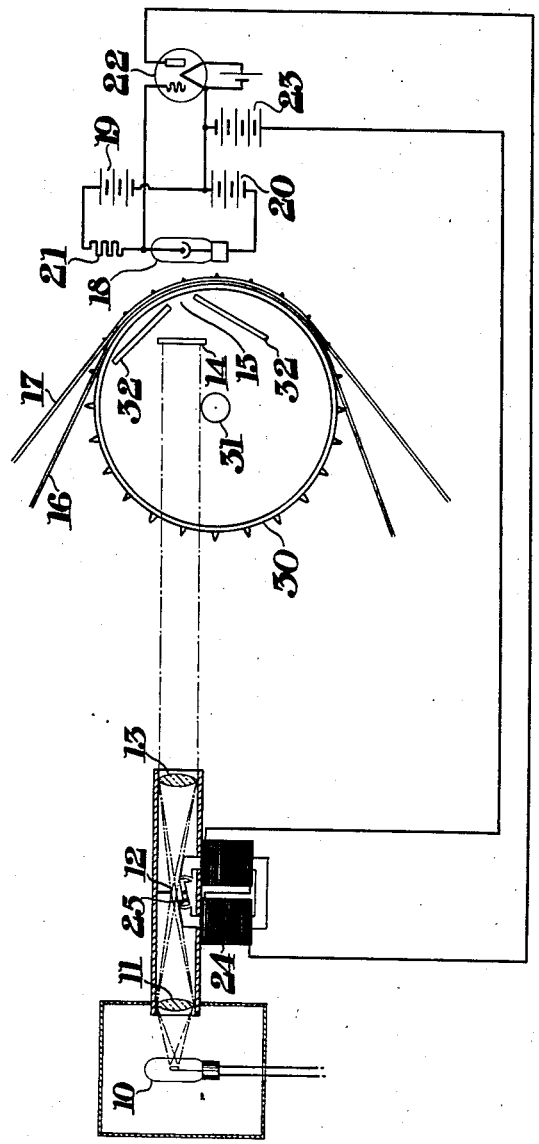
Armand Georges Denis,
Inventor,
By Newton N. Perrins
Rolla N. Carter
Attorneys Patented Sept. 11, 1934

1,973,470

UNITED STATES PATENT OFFICE 1,973,470

PHOTOGRAPHIC PRINTING APPARATUS

Armand Georges Denis, Rochester, N. Y., assignor to Eastman Kodak Company, Rochester, N. Y., a corporation of New York Application May 11, 1931, Serial No. 536,477

5 Claims. (Cl. 95—75)

My invention relates to motion picture printing apparatus, and particularly to apparatus of the automatic or semi-automatic type. In general it relates to apparatus of the type disclosed in my co-pending application Serial No. 532,159 filed April 23, 1931, for controlling the printing of a negative in such a manner that uniform exposures are given each frame, regardless of variations in the density of successive negative frames.

My present invention is primarily directed to printing apparatus in which the source of illumination is maintained at substantially constant intensity and in which the amount of illumination falling on the negative at the printing gate is varied by interposing between the source of light and the printing gate a mechanical shutter or diaphragm of variable openings. In my above identified co-pending application a radiation sensitive element measures directly the intensity of the illumination reaching the positive film, or a quantity rigidly proportional to it and so controls the modulation of the light source that the element operates at substantially constant reading.

The present invention, while utilizing this same general method, is intended to disclose an apparatus which permits the use as a source of light of any lamp, which may be of high intensity and may be operated at a constant level. The advantages of such a source of light will be clear from the following description.

The use of a source of illumination of constant intensity, modulated mechanically, at once obviates the difficulty which may result from the changes of spectral-distribution of the light which characteristically accompanies direct modulation in the most desirable sources of light, and notably in the tungsten lamps. Mechanical modulation of a constant source results in no change in spectral-distribution; the intensity variation of the light in any region of the spectrum may therefore be used as a direct measure of the variation of actinic intensity, and any light sensitive element may be used as a measuring element.

It is an object of my invention to provide printing apparatus which will instantaneously and automatically regulate the radiant energy level incident on the negative in such a manner that the radiant energy transmitted by the negative is maintained at a substantially constant level.

Another object of my invention is to provide a method and means for automatically controlling the printing of continuous films in such a manner that each successive frame of the positive shall receive a substantially identical amount of illumination, irrespective of the density of the corresponding negative frame.

Another object of my invention is to provide apparatus for printing motion picture film in which a radiation sensitive element controls the modulation of a light beam in accordance with the amount of light transmitted by the negative being printed in such a way that the light transmitted by the negative remains substantially constant irrespective of the density of the negative.

Other objects and advantages of my invention will be apparent from the following description when read in connection with the accompanying drawing and its scope will be pointed out in the appended claims.

The single figure of the drawing illustrates schematically an automatic printer in which my invention is incorporated. The light from a fixed source 10 is adapted to be collected by a lens 11 which forms an aerial image of the light source at the aperture 12 and a lens 13 concentrates the light on a diffusing member 14 positioned in front of a printing gate 15. A negative film 16 and a positive film 17 are adapted to be moved together continuously and at a uniform rate past the gate 15 for exposure to the printing light. The diffusing member 14 causes uniform illumination at the gate 15 which is preferably of a width equal to a frame and one frame line.

A split sprocket wheel 30 of a well known type mounted on a shaft 31 adapted to be uniformly driven by any suitable mechanism (not shown) directs the negative and positive films 16 and 17 through the printing position. The printing gate 15 is defined by shields 32 opaque to actinic light. The portions of the shields 32 adjacent the gate 15 may be made of material which will transmit non-actinic light if it is desired to make available to the light sensitive element 18 a greater amount of measuring light. The size of the printing gate 15 and the rate of movement of the films 16 and 17 being constant, it is evident that the time, during which any given portion of the positive film 17 is exposed, is constant and since, as hereinafter described, the intensity of the light falling on the positive film is maintained constant, there is no opportunity for failure of the law of reciprocity to produce deleterious effects in the printing.

A light sensitive element 18 which may be a photo-cell is placed to receive radiation transmitted by the negative and positive being printed.

The photo-cell 18 is polarized by the batteries 19 and 20 and coupled through the resistance 21 to the input circuit of a vacuum tube 22. The vacuum tube 22 is so polarized, by connection of its cathode midway between the batteries 19 and 20 that its impedance is caused to change from a very high value to a low value by variations in the potential drop across the resistance 21 negligible in comparison with the total voltage drop across the resistance 21. In other words, the tube 22 is so connected that its impedance is controlled by the amount of illumination falling on the light sensitive element 18 and a small departure of this amount of illumination from its predetermined level is sufficient to vary the grid cathode potential of the tube 22 through its critical range, and small changes in illumination will result in large changes in the plate current of the tube 22 as fully explained in my above identified co-pending application.

In series with the plate circuit of the tube 22 is the usual B battery 23 and a solenoid 24 which is adapted to control the movement of an armature 25 for varying the size of aperture 12 in accordance with the plate current and effectively controls and modulates the admission of light from the source 10 to the diffusing member 14 and is so adjusted that when the illumination falling on the light sensitive element 18 tends to be slightly in excess of that found to correspond to correct printing at the gate 15, and the plate current of the tube 22 consequently tends to fall below a certain value, this fall of plate current results in the armature 25 being rapidly displaced in a direction which decreases the admission of light to the printing gate 15; while if the illumination falling on the light sensitive element 18 tends to become less than that found to correspond to correct printing at gate 15 and the plate current of tube 22 consequently tends to increase above a certain value, this increase of plate current results in the armature 25 being rapidly displaced in a direction which increases the admission of light to the printing gate 15. The armature 25 is biased to wide open aperture position by suitable means such as a spring (not shown).

The solenoid 24 is so designed that movement of the armature from a position at which the aperture is completely uncovered to a position at which the aperture is completely masked, results from a change in the impedance of the tube 22 from a high value to a relatively low value. As has been previously explained this change of impedance of the tube 22 results from negligibly small variations of illumination at the printing gate.

In the operation of the system, therefore, irrespective of the density of the negative at the printing gate, the armature of the solenoid 24 must automatically assume such a position that the amount of illumination reaching the light sensitive element 18, and, therefore, the amount of illumination reaching the positive film, after modulation and partial absorption of the negative, can only vary by a negligible amount from a pre-determined value, at which the potential drop across the resistance 21 brings the grid of the tube 22 within the critical grid cathode potential range. If the position of the armature allowed too much light to fall on the positive film, the photo-current through the sensitive element 18 would increase appreciably; the potential drop across the resistance 21 would also increase appreciably, thereby making the grid of tube 22 markedly negative to the cathode, and thus increase the impedance of the tube 22 to a high value. The plate current through the tube 22 would thus fall to a low value, and the decrease of the current through the solenoid would allow its armature to diminish the aperture, thus decreasing the illumination transmitted to the diffusing member 14.

The printer above described is of the continuous type and it will be obvious, if it is desired to use a step by step printer, that no other adjustment need be made than to provide a suitable shutter mechanism for occluding the printing light during the movement of the film. When using a step by step printer I prefer to employ a shutter made of some material opaque to actinic light but, so far as possible, transparent to radiations to which the light sensitive element is sensitive in order to minimize the disturbance of adjustment of the armature 25 of the solenoid 24. With a caesium cell, for instance, used as the light sensitive element, a transparent red or yellow shutter while as effective as an opaque shutter in cutting off actinic light from the film during the operation of the pull-down mechanism, allows almost as much measuring light to fall on the cell during the passage of the shutter as during the printing period and is extremely effective both in accelerating the adjustment of the control mechanism to the required level and in minimizing the swinging of the armature 25 resulting from each passage of the shutter. A composite shutter which, while alternately allowing and preventing the passage of actinic light, maintains a constant absorption factor for the light affecting the light sensitive device is still more effective and may be used.

Since in my invention the source of light is not modulated directly it may be energized entirely from the mains and the wattage is not limited, as in the case of direct modulation, by considerations of practical amplifier design. High intensities are thus possible; which is of advantage in increasing the speed of printing or the range of negative density which may be covered. High intensities of measuring light by means of a filter which keeps the actinic intensity to a low level, while freely transmitting the measuring light may also be obtained, permitting the use of a less sensitive measuring element. Since the lamp is operated at constant wattage there is in the method here described no problem connected with the heat capacity of the filaments tending to introduce an undesirable time factor. The inertia of the mechanical modulating system on the other hand introduces mechanical lag, and this for satisfactory operation must be kept at a very low value. The mechanical modulating system described requires but little power and permits an amplifier design of great simplicity and economy; an automatic control system may thus be built which, while it has the advantage of flexibility, self-regulation, and freedom from adjustment which characterize the use of the measuring element operated at constant reading, is nevertheless simple and inexpensive.

Wherever the term "actinic" light is used herein, it is meant to embrace, as it does in ordinary photographic literature, mainly the shorter wave lengths of the spectrum such as violet, blue and blue-green, to which most positive emulsions are largely sensitive. The term "non-actinic" light is used to denote the longer wave lengths of the spectrum to which most films are relatively insensitive. These wave lengths will be the yellow, orange, red and infra-red generally.

While I have described in detail one way of practicing my invention to comply with the requirements of the statutes, I wish it understood that I do not intend to be limited to the exact method or apparatus described inasmuch as in view of the disclosure obvious modifications will readily suggest themselves to those familiar with this art without departing from the spirit of my invention or the scope of the claims herein.

What I claim as new and desire to secure by Letters Patent of the United States is:

1. Photographic printing apparatus for controlling the exposure given a sensitized layer through a photographic record, comprising a light source of constant intensity, an optical system for directing a beam of light from said source to said photographic record, means in said system for varying the amount of light reaching said record, a light sensitive element positioned to be activated by a constant proportion of the light transmitted by said record, amplifying means for controlling said light varying means and so connected with said light sensitive element that negligibly small variations in the amount of light transmitted by said record results in large variations in the said light varying means.

2. Means for controlling the printing of a photographic record on a sensitive layer, comprising means for continuously advancing the record and the layer through a printing position, a source of light, a first lens for producing an aerial image of the light source and a second lens for concentrating the light on a diffusing member positioned in front of said printing position, movable means for variably occluding the aerial image from said second lens, a light sensitive element positioned to be activated continuously by light transmitted by said record and said layer at the printing position and operative through an amplifier to control the movement of said movable means, said amplifier being so connected that a small change in either direction in the response of said sensitive element produces a relatively large movement, in an opposite direction, of said movable means, whereby changes in the density of the record being printed produce proportional changes in the light falling on said record.

3. Photographic printing apparatus of the variable intensity-constant time type comprising a source of light of constant intensity, optical means for directing a beam of light from said source to a printing window, adjustable means for varying the intensity of the beam of light falling on the printing window, driving means for continuously advancing a photographic record and a sensitized layer past said window, a thermionic amplifier having its plate circuit connected with said adjustable means, and means for varying the grid potential of said amplifier in accordance with the intensity of the light transmitted by said record at said window, whereby negligibly small changes in intensity of the light transmitted by said record results in relatively large changes in the opposite sense in the intensity of the light falling on said record at the printing window.

4. The combination with apparatus for exposing a sensitized layer to light passed through a photographic record, of means for directing a beam of light to the record, means for translating the intensity of the exposing light transmitted by the record into a corresponding electric potential, an electrical circuit controlled by said potential and electro-mechanical means in said circuit for varying the intensity of said beam of light, the complete arrangement forming a photo-electric governor operative to maintain substantially constant at a predetermined value said electric potential, whereby the exposing light falling on said layer is of a predetermined intensity.

5. Photographic printing apparatus including a source of light, an element responsive to light, an exposure window between said source and said element, means for directing an image bearing film past said window, means for directing a beam of light from said source upon said window whereby said element is activated by light transmitted by said film, adjustable means for varying the intensity of said beam of light, a self-balancing photo-electric circuit arrangement including said element, said adjustable means and said variable light beam for maintaining at a constant level the intensity of the light falling on said element, and means for adjusting the level at which said circuit is self-balancing.

ARMAND GEORGES DENIS.